US008010267B2

(12) United States Patent
Klooster et al.

(10) Patent No.: US 8,010,267 B2
(45) Date of Patent: Aug. 30, 2011

(54) METHODS AND SYSTEM FOR TIME OF ARRIVAL CONTROL USING AVAILABLE SPEED AUTHORITY

(75) Inventors: Joel Kenneth Klooster, Grand Rapids, MI (US); Keith Douglas Wichman, Grand Haven, MI (US)

(73) Assignee: General Electric Company, Schenectady, NY (US)

( * ) Notice: Subject to any disclaimer, the term of this patent is extended or adjusted under 35 U.S.C. 154(b) by 482 days.

(21) Appl. No.: 12/262,326

(22) Filed: Oct. 31, 2008

(65) Prior Publication Data

US 2010/0114407 A1 May 6, 2010

(51) Int. Cl.
*B64C 1/00* (2006.01)
*G01C 21/00* (2006.01)
*G06F 7/00* (2006.01)
(52) U.S. Cl. ............... 701/66; 701/7; 701/121; 244/182
(58) Field of Classification Search .................. 701/66, 701/3, 20, 70, 7, 121, 206; 244/11, 182; 340/441, 461; 455/67, 16
See application file for complete search history.

(56) References Cited

U.S. PATENT DOCUMENTS

| 5,121,325 | A | 6/1992 | DeJonge |
| 5,247,440 | A | 9/1993 | Capurka et al. |
| 5,398,186 | A | 3/1995 | Nakhla |
| 5,408,413 | A | 4/1995 | Gonser et al. |
| 5,526,265 | A | 6/1996 | Nakhla |
| 5,544,225 | A | 8/1996 | Kennedy, III et al. |
| 5,574,647 | A | 11/1996 | Liden |
| 5,579,376 | A | 11/1996 | Kennedy, III et al. |
| 5,694,322 | A | 12/1997 | Westerlage et al. |
| 5,699,275 | A | 12/1997 | Beasley et al. |
| 5,713,007 | A | 1/1998 | Lecomte et al. |
| 5,724,243 | A | 3/1998 | Westerlage et al. |
| 5,734,981 | A | 3/1998 | Kennedy, III et al. |
| 5,751,609 | A | 5/1998 | Schaefer, Jr. et al. |
| 5,771,455 | A | 6/1998 | Kennedy, III et al. |

(Continued)

FOREIGN PATENT DOCUMENTS

EP 0637787 A1 2/1995

(Continued)

OTHER PUBLICATIONS

PCT Application No. PCT/US2009/059796, Search Report, Apr. 6, 2010.

*Primary Examiner* — Tan Q Nguyen
(74) *Attorney, Agent, or Firm* — David J. Clement, Esq.; Armstrong Teasdale LLP

(57) ABSTRACT

Methods and a system for a vehicle control system using a reference time profile including an upper control bound and a lower control bound are provided. The system includes an input device configured to receive a required time of arrival at a waypoint and a processor communicatively coupled to said input device wherein the processor is programmed to generate a reference time profile using a first speed profile up to an intermediate control point and a second speed profile between the intermediate control point and an RTA waypoint. The system also includes an output device communicatively coupled to the processor wherein the output device is configured to transmit a speed control signal based on the reference time profile to a vehicle speed control system.

20 Claims, 7 Drawing Sheets

U.S. PATENT DOCUMENTS

| | | | |
|---|---|---|---|
| 5,842,142 A | 11/1998 | Murray et al. |
| 5,890,101 A | 3/1999 | Schaefer, Jr. et al. |
| 5,970,481 A | 10/1999 | Westerlage et al. |
| 5,987,377 A | 11/1999 | Westerlage et al. |
| 5,987,397 A | 11/1999 | McCool et al. |
| 6,009,330 A | 12/1999 | Kennedy, III et al. |
| 6,240,295 B1 | 5/2001 | Kennedy, III et al. |
| 6,295,449 B1 | 9/2001 | Westerlage et al. |
| 6,408,307 B1 | 6/2002 | Semple et al. |
| 6,415,291 B2 | 7/2002 | Bouve et al. |
| 6,507,782 B1 | 1/2003 | Rumbo et al. |
| 6,510,186 B1 | 1/2003 | Chen et al. |
| 6,510,383 B1 | 1/2003 | Jones |
| 6,531,978 B2 | 3/2003 | Tran |
| 6,549,594 B1 | 4/2003 | Chen et al. |
| 6,584,400 B2 | 6/2003 | Beardsworth |
| 6,600,991 B1 | 7/2003 | Jardin |
| 6,604,030 B1 | 8/2003 | Davis et al. |
| 6,646,588 B2 | 11/2003 | Tran |
| 6,658,349 B2 | 12/2003 | Cline |
| 6,970,784 B2 | 11/2005 | Shinagawa |
| 7,117,075 B1 | 10/2006 | Larschan et al. |
| 7,272,491 B1 | 9/2007 | Berard |
| 7,283,895 B2 * | 10/2007 | Bouchet | 701/3 |
| 7,756,632 B2 * | 7/2010 | Wise et al. | 701/204 |
| 2005/0216140 A1 | 9/2005 | Bouchet |
| 2008/0228333 A1 | 9/2008 | De Menorval et al. |
| 2009/0112454 A1 * | 4/2009 | Wachenheim et al. | 701/121 |

FOREIGN PATENT DOCUMENTS

| | | | |
|---|---|---|---|
| WO | 02093281 A1 | 11/2002 |

* cited by examiner

METHODS AND SYSTEM FOR TIME OF ARRIVAL CONTROL USING AVAILABLE SPEED AUTHORITY

BACKGROUND OF THE INVENTION

This invention relates generally to controlling a speed of a vehicle and, more particularly, to methods and a system for time of arrival control of a vehicle using available speed range.

Although aircraft have historically been controlled only in the lateral and vertical domains, the use of aircraft control in the time domain may enable advanced airspace management resulting in increased capacity. The use of time-based arrival management facilitates earlier landing time assignments and more efficient use of the runway. The use of time-based arrival management results in economic benefits if each aircraft can determine its desired landing time using its most fuel optimum flight profile.

The ability to control aircraft in the time domain is enabled primarily by the use of a Required Time-Of-Arrival (RTA) constraint on a waypoint in the flight plan. In addition to controlling to the Required Time-of-Arrival, the algorithm computes an estimated Earliest and Latest Time-of-Arrival using the maximum and minimum operating speeds, respectively. However, the RTA algorithm was designed with enroute operations in mind and has drawbacks when used for operations in the terminal phase.

Important parameters associated with RTA operation as used herein are:
(1) RTA waypoint (crew entered or uplinked)
   The waypoint where a required crossing time is specified.
(2) RTA time (crew entered or uplinked)
   The required crossing time expressed in hours:minutes: seconds (traditionally in GMT, but not limited to only in GMT).
(3) RTA tolerance (default, crew entered, or uplinked)
   The allowable plus and minus crossing time tolerance that is considered to be on-time expressed in seconds.
(4) Current ETA (computed)
   Estimated time of arrival at the RTA waypoint.
(5) First time (computed)
   Earliest possible time of arrival using the fastest allowable speed within aircraft limits.
(6) Last time (computed)
   Latest possible time of arrival using the slowest allowable speed within aircraft limits.
(7) Distance to RTA waypoint (computed)
   Along path distance to go to the RTA waypoint.
(8) RTA Error (computed)
   Difference between (2) RTA time and (4) Current ETA expressed as EARLY or LATE time in hours, minutes and seconds when the difference is outside (3) RTA tolerance.

Upon entering the RTA waypoint (1), the operator is prompted with RTA time (2) equal to the predicted ETA using the default cost-optimal flight profile. This is the desired time of arrival using minimum cost profile for the flight. The operator can change the prompted value by entering a new value that may be assigned by air traffic control. The resulting RTA speed target shown is provided as the active speed command to the autopilot and displayed on the primary flight display. The target speed may be overridden by any applicable speed restriction. The restricted speed is taken into account when computing the estimated time of arrival. By following the active speed command, the aircraft should achieve the RTA if it is within the aircraft speed bounds to do so. In at least one known implementation, a time profile comprising the ETA at each waypoint and trajectory change point is computed using the current assumed speed profile (using the current cost index). The earliest and latest possible times-of-arrival are estimated only for the RTA waypoint, using the maximum and minimum cost index, respectively. However, improvements to the RTA algorithm for operations constrained late in descent including at the runway threshold itself are needed.

BRIEF DESCRIPTION OF THE INVENTION

In one embodiment, a vehicle control system uses a reference time profile including an upper control bound and a lower control bound and includes an input device configured to receive a required time of arrival at a waypoint and a processor communicatively coupled to the input device. The processor is programmed to determine an intermediate control point wherein the intermediate control point is a point along the upper and lower control bounds where a difference between the upper and lower control bounds is equal to approximately $2\alpha\text{Tol}$, where Tol is an RTA tolerance and $\alpha$ is a scaling factor. The processor is further programmed to determine an intermediate control time wherein the intermediate control time is approximately halfway between an upper control bound time and a lower control bound time such that a margin of approximately $\alpha\text{Tol}$ is provided on either side of the intermediate control time. Moreover, the processor is also programmed to generate a first speed profile wherein the first speed profile is the speed profile necessary to meet the intermediate control time, starting from the current aircraft position at the current time and generate a second speed profile wherein the second speed profile is the speed profile necessary to meet the RTA starting from the intermediate control point at the intermediate control time. The processor is programmed to generate the reference time profile using the first speed profile up to the intermediate control point and the second speed profile between the intermediate control point and the RTA waypoint. The system further includes an output device communicatively coupled to the processor wherein the output device is configured to transmit a speed control signal based on the two speed profiles to a vehicle speed control system.

In another embodiment, a method of controlling a speed of a vehicle along a track includes receiving a required time of arrival (RTA) at a predetermined waypoint, determining a late time bound representing the latest time the vehicle could arrive at a point along the track and still arrive at the predetermine waypoint at the RTA while transiting at a maximum available speed, and determining an early time bound representing the earliest time the vehicle could arrive at a point along the track and still arrive at the predetermine waypoint at the RTA while transiting at a minimum available speed. The method also includes applying a control aggressiveness scaling factor $\gamma$ that is selected to provide a control aggressiveness to at least one of the late time bound and the early time bound, scaling factor $\gamma$ controlling a frequency of speed corrections and a magnitude of speed corrections, generating a speed control signal based on the early and late time bounds, and outputting a speed signal to a vehicle speed control system.

In yet another embodiment, a method of controlling a speed of a vehicle includes determining a required time of arrival (RTA) deadband including an activate late control that generates a first speed control signal and an activate early control that generates a second speed control signal, where the RTA represents the required time-of-arrival at an RTA waypoint and outputting at least one of the first speed control signal and the second speed control signal to a vehicle speed control system.

BRIEF DESCRIPTION OF THE DRAWINGS

FIG. 1 is a graph of a time window for an RTA waypoint as a function of distance to the RTA waypoint for an exemplary aircraft flight;

FIG. 2 is a graph of exemplary parameters generated by a known implementation of an RTA algorithm;

FIG. 3 is a graph of an RTA time window illustrating an area of limited speed control authority prior to the RTA waypoint;

FIG. 4 is a graph of early and late backwards time profiles in accordance with an exemplary embodiment of the present invention;

FIG. 5 is a graph of early and late backwards time profiles when the current time uncertainty falls at or outside of the scaled boundaries;

FIG. 6 is a graph illustrating determining a Reference Time Profile 602 in accordance with an exemplary embodiment of the present invention; and FIG. 7 is a schematic block diagram of a vehicle control system using a reference time profile including an upper control bound and a lower control bound.

DETAILED DESCRIPTION OF THE INVENTION

The following detailed description illustrates embodiments of the invention by way of example and not by way of limitation. It is contemplated that the invention has general application to methods of controlling to a time-of-arrival that takes into account the available speed control authority (defined as the allowable range of speeds) when the RTA time is placed at a waypoint for which there is a period of limited speed control authority prior to the waypoint. At least some known RTA algorithms, designed with the enroute flight phase in mind, do not allow for sufficient RTA precision during the descent phase where the control authority over time using speed is diminishing rapidly. A common example of this case is the airport speed-restriction altitudes (e.g., 250 knots below 10,000 feet), although it also holds whenever the speed is limited in at least one direction (speed up or slow down) due to either the vehicle's operating speed envelope or procedural speed constraints (such as a Constant Mach Segment or waypoint speed restrictions).

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
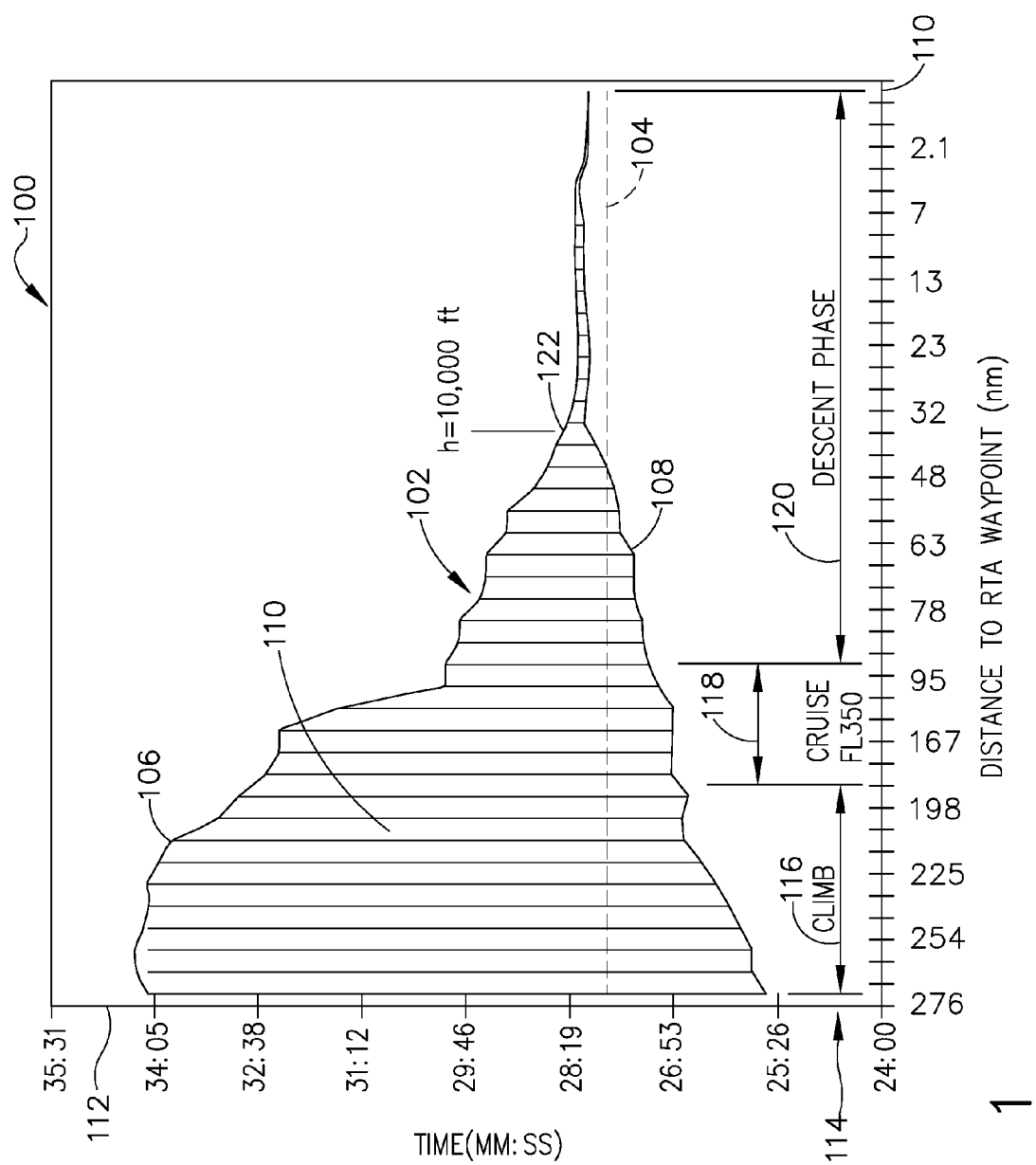
FIGS. 1-7 show exemplary embodiments of the methods and system described herein.

FIG. 1 is a graph 100 of a time window 102 for an RTA waypoint as a function of distance to the RTA waypoint for an exemplary aircraft flight. In the exemplary embodiment, an RTA 104 to a waypoint is indicated as a time value along graph 100. Time window 102 represents a diminishing RTA control authority illustrated between a trace 106 of a latest arrival time (LAT) and a trace 108 plotting an earliest arrival time (EAT). Graph 100 includes an x-axis 110 graduated in units of distance to a predetermined RTA waypoint. The graduation of x-axis 110 may be converted to for example, time to the predetermined RTA waypoint by dividing the distance by the speed of the aircraft. Graph 100 includes a y-axis 112 graduated in units of time. Trace 106 and trace 108 define RTA time window 102 between them. A flight profile 114 is divided into a climb portion 116, a cruise portion 118, and a descent phase 120. For precision RTA operation, it is necessary to ensure that the ETA at a constraint waypoint is not permitted to vary greatly from the RTA. This need is due to diminished speed (and therefore time) control authority in the portion of the flight where speed is constrained. FIG. 1 illustrates such a situation for an exemplary flight. RTA window 102 is plotted with respect to a distance to RTA waypoint where the RTA was established at a runway threshold during flights. As shown in FIG. 1, after a 250-knot speed restriction 122 is reached at 10,000 feet, there is little remaining control authority to achieve the RTA as evidenced by the sudden narrowing of RTA window 102.

Figure 2:
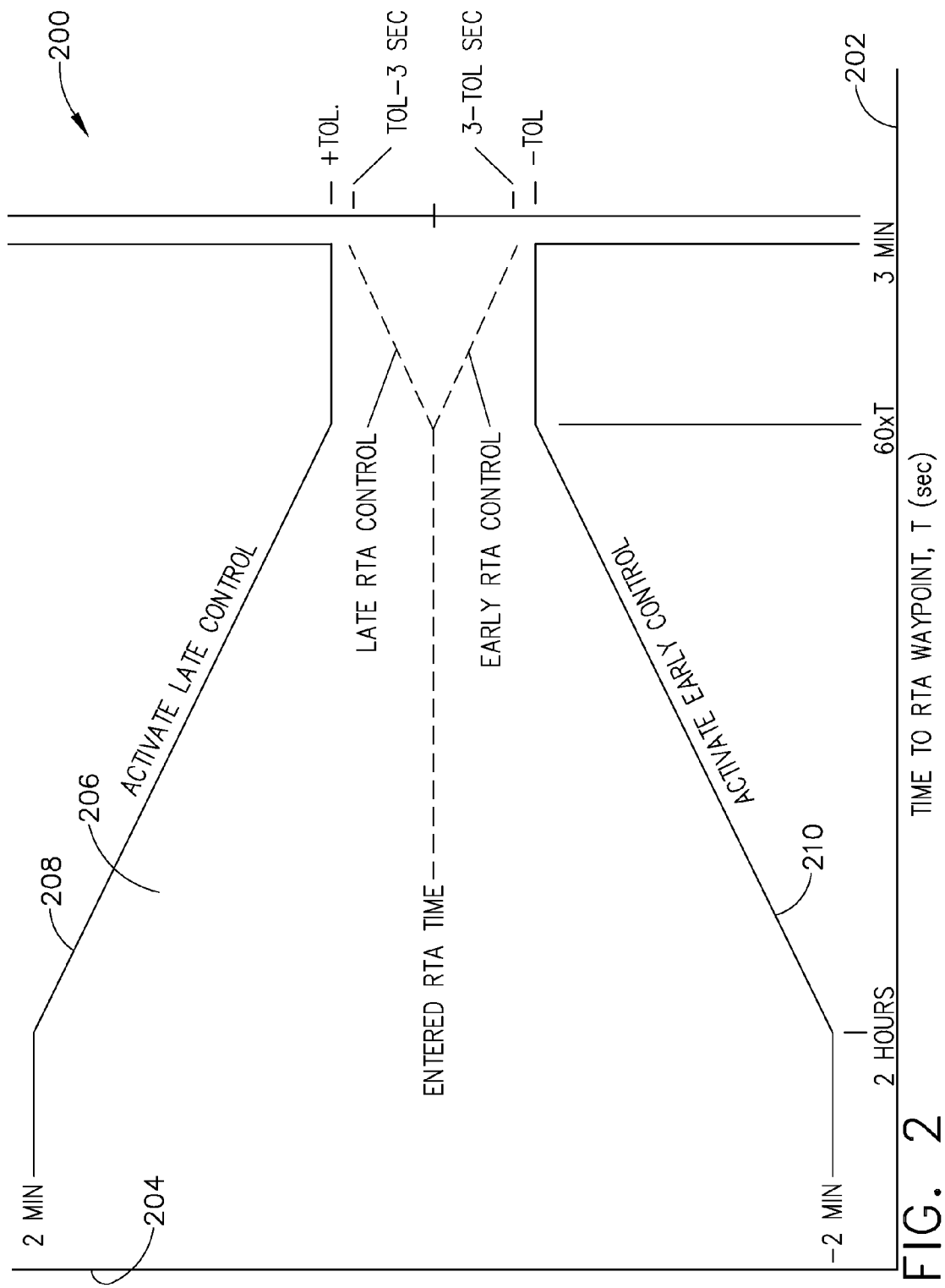

FIG. 2 is a graph 200 of exemplary parameters generated by a known RTA algorithm. Graph 200 includes an x-axis 202 graduated in units of time to a predetermined RTA waypoint and a y-axis 204 graduated in units of time about the predetermined RTA.

Graph 200 includes an RTA window or deadband 206 which increases with time (and therefore distance) to the RTA constraint. Deadband 206 is bounded by an activate late control authority 208 and an activate early authority 210. Deadband 206 is selected to permit an approximately 3-5 knots of speed adjustment when the deadband bound is triggered, only in the enroute portion of the flight. However, for an RTA at a waypoint in a speed constrained portion of the flight, there is generally a large portion of the flight profile which is constrained by for example, but not limited to airport speed restrictions, and configuration speed requirements such that deadband 206 can result in much larger speed corrections than 3-5 knots when the bound is reached such as speed corrections of 20-30 knots when the control is triggered.

To achieve the desired RTA performance in descent control deadband 206 is modified to reflect the available time-control authority at a given point in time. If the control authority is limited as described above, deadband 206 is adjusted to be more sensitive to deviations from RTA. That is, it should permit a smaller error between ETA and RTA before triggering a correction.

However, the minimum and maximum speeds may be used to generate an Early Time Profile (comprising a FIRST_TIME at each point between the aircraft and the RTA waypoint) and Late Time Profile (comprising the LAST_TIME at each point) while stilling achieving the RTA time. This gives increased knowledge of where the speed-control authority ends, and facilitates an algorithm to compute a modified speed profile that preserves the maximum amount of flexibility to accommodate disturbances (for example stronger than forecast headwinds). If the uncertainties associated with the current time and these Early and Late Time Profiles are known, these uncertainties can also be used in the control algorithm. Although this requires additional processing and storage, it results in a more robust control algorithm.

Figure 3:
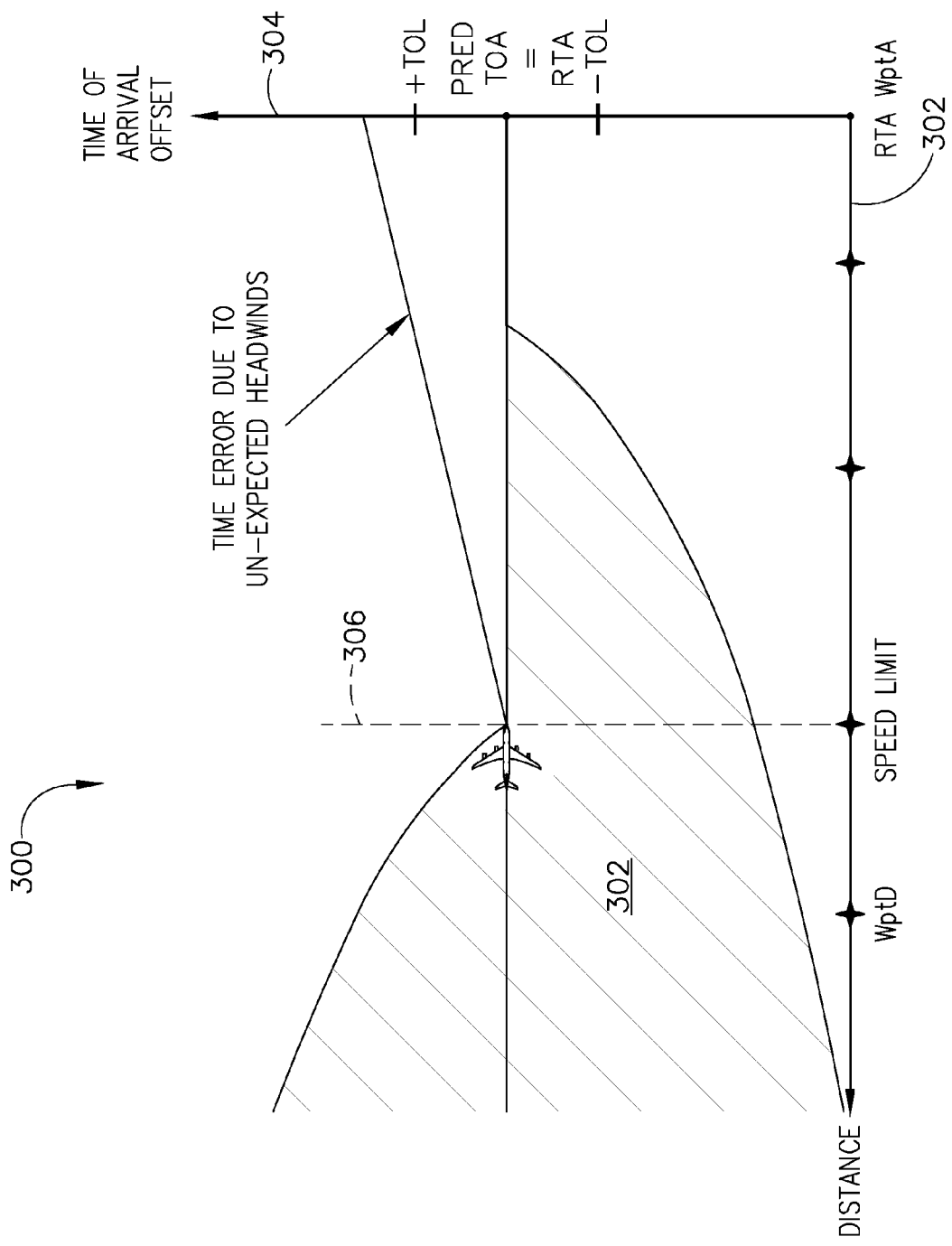

FIG. 3 is a graph 300 of an RTA time window 302 illustrating an area of limited speed control authority prior to the RTA waypoint. In the exemplary embodiment, graph 300 includes an x-axis 302 graduated in units of distance to a predetermined RTA waypoint WptA and a y-axis 304 graduated in units of time representing a time of arrival offset from the predetermined RTA to WptD.

When there is an area of limited speed control authority prior to the RTA waypoint, operating the aircraft to maintain the RTA may be difficult. As shown in FIG. 3, a speed limit 306 may bound the maximum speed achievable by the aircraft. Even if there is no RTA Error (ETA=RTA) when the aircraft crosses the speed limit altitude, if the current aircraft speed target is equal to the maximum speed (in this case the airport speed restriction) there is no more speed up authority. Thus, an unexpected headwind of sufficient magnitude may cause a LATE RTA Error requiring an increase in speed to eliminate the error and achieve the RTA time. However, the loss of speed up control authority means that the error cannot be reduced and the RTA may not be achieved.

A computation of a full Early and Late time profile backwards from the RTA waypoint provides knowledge of the earliest and latest times that the aircraft could arrive at any point and still achieve the RTA by using the minimum and maximum speeds, respectively. These Early and Late Backwards Time Profiles may be computed by integrating equations of motion backwards from the RTA waypoint at the RTA time, using the maximum and minimum speeds, respectively. Additionally, a time error due to external influences on the vehicle including for example, but not limited to head and tailwinds, climbs and descent to avoid weather patterns and turbulence, and deviations from course to avoid weather patterns may be introduced. Such an error may be able to be corrected for using additional information supplied from the vehicle instrumentation or off-board sources.

Figure 4:
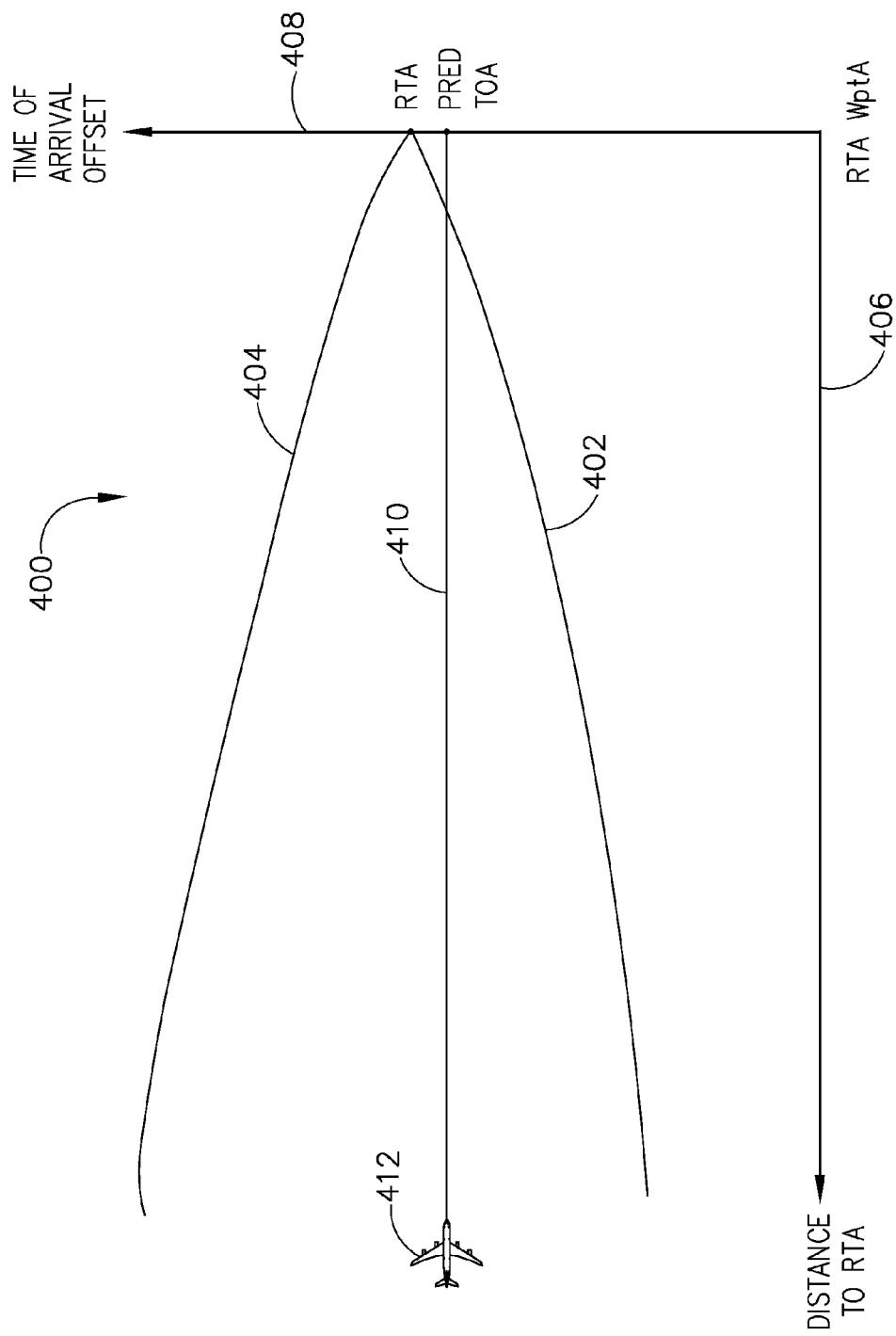

FIG. 4 is a graph 400 of early and late backwards time profiles in accordance with an exemplary embodiment of the present invention. In the exemplary embodiment, an early time bound 402 and a late time bound 404 are computed by integrating equations of motion backwards from the RTA waypoint at the RTA time. Graph 400 includes an x-axis 406 graduated in units of distance to RTA waypoint WptA and a y-axis 408 graduated in units of time representing a time of arrival offset from the predetermined ETA at each point between aircraft 412 and RTA waypoint WptA.

A first trace 410 represents a time-of-arrival at each point between aircraft 412 and RTA waypoint WptA computed using the reference speeds. Early time bound 402 is computed by moving backwards from RTA waypoint WptA at the minimum speed achievable by aircraft 412. Early time bound 402 represents the earliest time aircraft 412 could arrive at any point and still achieve the RTA by flying at the minimum speeds. Likewise, late time bound 404 represents the latest time aircraft 412 could arrive at that point and still achieve the RTA by flying at the maximum speeds.

Early time bound 402 and late time bound 404 may be scaled by a factor γ where, 0.0<γ<1.0. Scaling factor γ represents a tuning parameter that is selected to provide a control aggressiveness for example, but not limited to an appropriate frequency of speed corrections while also resulting in speed corrections of an appropriate magnitude. Because the minimum, maximum, and reference speeds are known in computing the three time profiles this factor γ may be time-dependant, and computed independently for the early and late directions to achieve the desired magnitude and frequency of speed changes.

In addition, there may be an uncertainty associated with the current time. The primary factors contributing to this time uncertainty are the Estimated Position Uncertainty (EPU), and the Input Time Uncertainty (ITU). If the EPU and ITU are both expressed as a 95% certainty (or 2 standard deviations), and both errors are normally distributed, the Current Time Uncertainty (CTU) may be computed by the Root-Sum-Squares (RSS) method as $$CTU = \sqrt{\frac{EPU^2}{Groundspeed^2} + ITU^2}$$

Accordingly, the actual current time at the measured position has a 95% probability of being in the range [Input_Time−CTU, Input_Time+CTU]. Using the Early and Late Time Profiles, along with the Current Time Uncertainty, a scaled RTA Control Deadband may then be computed as:

--- a. Activate_Late_Control shall be performed if:
   (RTA − Current Time)> Min_Time_To_Go
   AND
   (ETA−RTA) > Min_Tolerance
   AND
   $\gamma_{LATE}$ × (LAT − Current Time) <= CTU
b. Activate_Early_Control shall be performed if:
   (RTA−Current Time) > Min_Time_To_Go
   AND
   (ETA−RTA) <= −Min_Tolerance
   AND
   $\gamma_{EARLY}$ × (Current Time − EAT) <= CTU
c. When RTA correction is computed, the algorithm shall attempt to zero the error between ETA and RTA+TimeBias. The magnitude of the TimeBias is calculated as follows:
IF [Time to Go] > 60 × [Min_Tolerance] then
    TimeBiasMagnitude = 0
ELSE
    TimeBiasMagnitude = [Time to Go]/60 − [Min_Tolerance]
The TimeBiasSign matches the sign of (ETA − RTA).
where:
ETA represents the estimated time-of-arrival at the RTA waypoint.
RTA represents the required time-of-arrival at the RTA waypoint.
Min_Time_To_Go represents the minimum time to go to the RTA waypoint to allow a speed change. RTA cannot adjust the speeds when within this time of the RTA waypoint. This is done to prevent extremely large speed changes just prior to sequencing the RTA waypoint.
Min_Tolerance represents the smallest allowable value of the RTA tolerance
Max_Tolerance represents the largest allowable value of the RTA tolerance
LAT "Latest Arrival Time" represents the Late Time Profile at current Distance to RTA Waypoint
EAT "Earliest Arrival Time" represents the Early Time Profile at current Distance to RTA Waypoint
$\gamma_{LATE}, \gamma_{EARLY}$ represents the scaling factor in late and early direction, respectively.

---

Figure 5:
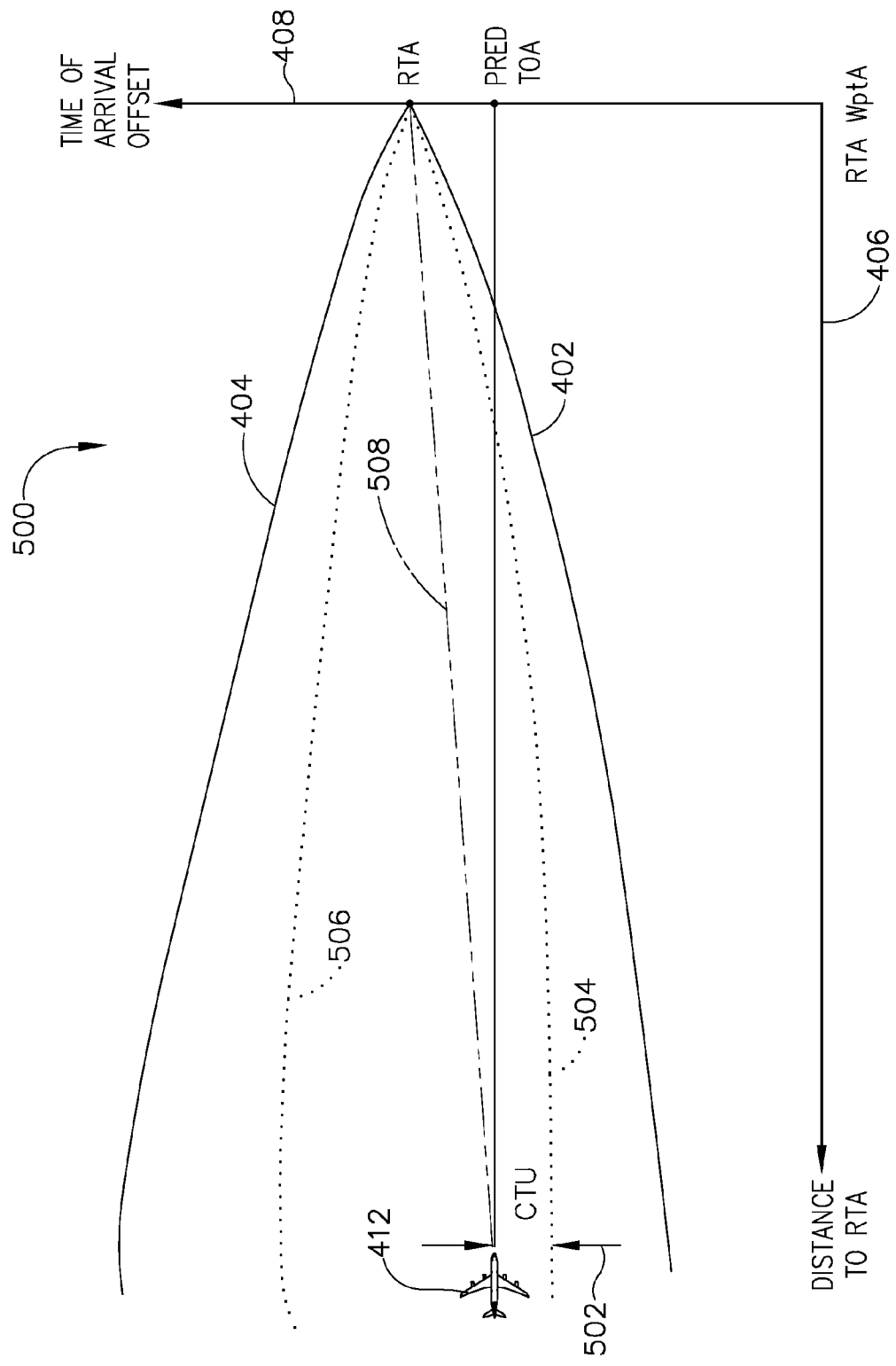

FIG. 5 is a graph 500 of early and late backwards time profiles when the current time uncertainty falls at or outside of the scaled boundaries. While the current time uncertainty (CTU) 502 is within a scaled early control boundary 504 and a scaled late control boundary 506, no speed adjustments are required. However, as shown in FIG. 5, when CTU 502 falls at or outside of scaled early control boundary 504 or scaled late control boundary 506, a speed up or slow down is computed to correct for the error.

Another advantage to using scaled early control boundary 504 and a scaled late control boundary 506 is the knowledge of where the speed control authority ends in each direction. This occurs, for example, when the speed up authority is limited by an airport speed restriction, waypoint speed constraints, or when the reference speed is already very close to the maximum speed. It is desirable to preserve speed control authority in both the speed up and slow down directions as long as possible. This allows greater flexibility for the control algorithm to make adjustments for disturbances (for example to compensate for the stronger than expected headwinds shown in FIG. 3) or for modeling errors in the reference time profile.

An example of early loss of speed control in the Speed Up (Late) direction was shown in FIG. 3. With the reference time profile in the scenario shown, the Speed Up Control Authority ends at the 250-knot airport speed limit at 10,000 feet, while there is still Slow Down Control Authority beyond this point. Later in the flight the speed must be equal to the final approach speed (Vref), and there is no control authority in either direction. With the original reference time profile, if any disturbances occur that would require Speed Up (Late) control beyond the point where speed up authority is lost, no adjustment is possible and the RTA may not be achievable. This problem may be alleviated by using a speed profile that maintains flexibility for speed adjustments as long as possible. This can be achieved by using multiple speed profiles to meet the RTA and generate a Reference Time Profile.

Figure 6:
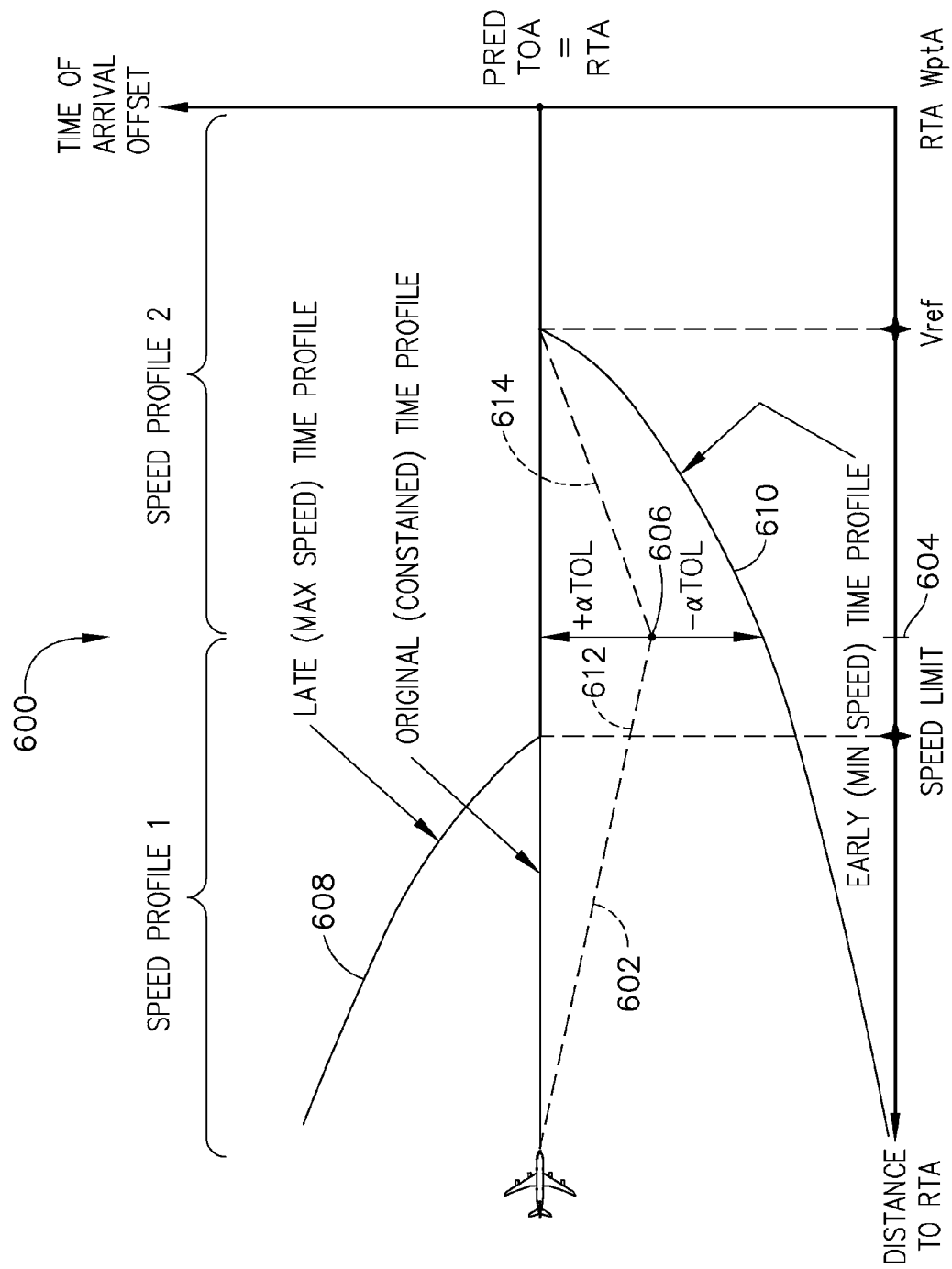

The scenario in FIG. 3 is shown again in FIG. 6, but with Reference Time Profile 602 that preserves the flexibility of both Speed Up and Slow Down Authority as long as possible.

FIG. 6 is a graph 600 illustrating determining a Reference Time Profile 602 in accordance with an exemplary embodiment of the present invention. An intermediate control point is determined, which is the point where the difference between the upper and lower Control Bounds is equal to 2αTol, where Tol is the RTA tolerance and α is a scaling factor. An intermediate control time 606 is determined as being approximately halfway between an Upper Control Bound 608 time and a Lower Control Bound 610 time. This gives a margin of αTol on either side of the intermediate control time. A first time profile 612 is generated, which is the speed profile necessary to meet the intermediate control time, starting from the current aircraft position at the current time. A second time profile 614 is generated, which is the speed profile necessary to meet the RTA starting from the intermediate control point 604 at the intermediate control time 606. A Reference Time Profile 602 is generated using first time profile 612 up to the intermediate control point and second time profile 614 between the intermediate control point and the RTA waypoint.

Figure 7:
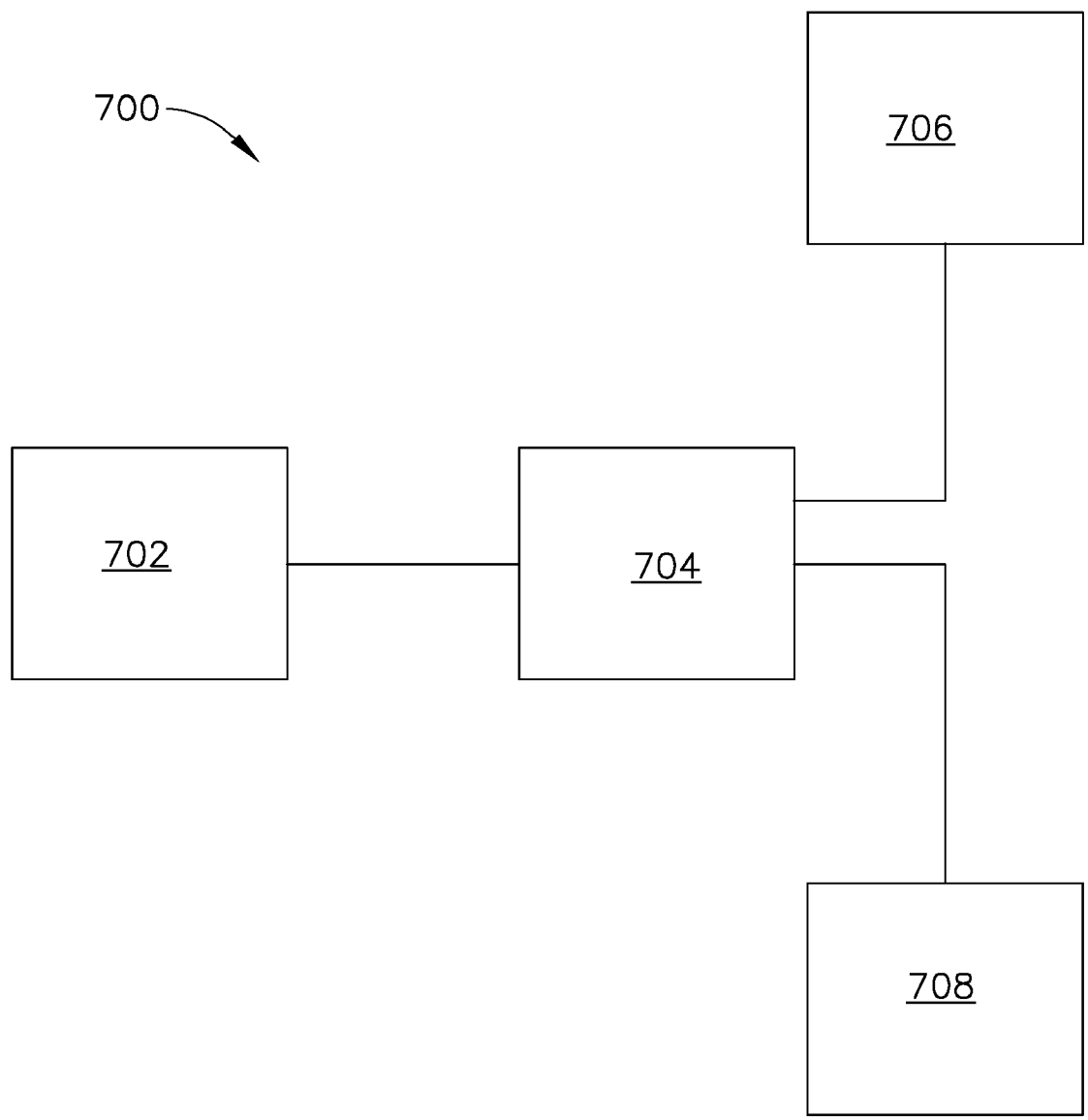

FIG. 7 is a schematic block diagram of a vehicle control system 700 using a reference time profile including an upper control bound and a lower control bound. In the exemplary embodiment, vehicle control system 700 includes an input device 702 configured to receive a required time of arrival at a waypoint and a processor 704 communicatively coupled to the input device. Processor 704 is programmed to determine an intermediate control point wherein the intermediate control point is a point along the vehicle trajectory where a difference between the upper and lower control bounds is equal to approximately 2αTol, where Tol is an RTA tolerance and α is a scaling factor. Processor 704 is further programmed to determine an intermediate control time wherein the intermediate control time is approximately halfway between an upper control bound time and a lower control bound time such that a margin of approximately αTol is provided on either side of the intermediate control time. Moreover, processor 704 is further programmed to generate a first speed profile wherein the first speed profile is the speed profile necessary to meet the intermediate control time, starting from the current aircraft position at the current time and to generate a second speed profile wherein the second speed profile is the speed profile necessary to meet the RTA starting from the intermediate control point at the intermediate control time. Processor 704 is further programmed to generate the reference time profile using the first speed profile up to the intermediate control point and the second speed profile between the intermediate control point and the RTA waypoint.

Vehicle control system 700 also includes an output device 706 communicatively coupled to processor 704. Output device 706 is configured to transmit a speed control signal based on the reference time profile to a vehicle speed control system (not shown). Vehicle control system 700 also includes a display device 708 configured to graphically display the generated reference time profile.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 704, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for providing accurate time-of-arrival control at a waypoint for which there is a period of limited speed control authority available. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of methods and a system of providing accurate time-of-arrival control at a waypoint for which there is a period of limited speed control authority available provides a cost-effective and reliable means for providing accurate time-of-arrival control at waypoints in the terminal area below the airport speed restriction altitude or for which a procedural speed constraint exists prior to the waypoint. More specifically, the methods and system described herein facilitate the ability to provide accurate time control in the terminal area, which facilitates earlier landing time assignments and more efficient use of the runway. In addition, the above-described methods and system provide economic benefits if each aircraft can determine its desired landing time using its most fuel optimum flight profile. As a result, the methods and system described herein facilitate automatically controlling the speed of a vehicle for arrival at a predetermined waypoint at a selected time in a cost-effective and reliable manner.

Exemplary methods and system for automatically and continuously providing accurate time-of-arrival control at a waypoint for which there is a period of limited speed control authority available are described above in detail. The apparatus illustrated is not limited to the specific embodiments described herein, but rather, components of each may be utilized independently and separately from other components described herein. Each system component can also be used in combination with other system components.

While the disclosure has been described in terms of various specific embodiments, it will be recognized that the disclosure can be practiced with modification within the spirit and scope of the claims.

What is claimed is:

1. A vehicle control system using a reference time profile including an upper control bound and a lower control bound, said system comprising:
    an input device configured to receive a required time of arrival at a waypoint;
    a processor communicatively coupled to said input device, said processor programmed to:
        determine an intermediate control point wherein the intermediate control point is a point along the upper and lower control bounds where a difference between the upper and lower control bounds is equal to approximately $2\alpha\text{Tol}$, where Tol is an RTA tolerance and $\alpha$ is a scaling factor;
        determine an intermediate control time wherein the intermediate control time is approximately halfway between an upper control bound time and a lower control bound time such that a margin of approximately $\alpha\text{Tol}$ is provided on either side of the intermediate control time;
        generate a first speed profile wherein the first speed profile is the speed profile necessary to meet the intermediate control time, starting from the current aircraft position at the current time;
        generate a second speed profile wherein the second speed profile is the speed profile necessary to meet the RTA starting from the intermediate control point at the intermediate control time; and
        generate the reference time profile using the first speed profile up to the intermediate control point and the second speed profile between the intermediate control point and the RTA waypoint; and
    an output device communicatively coupled to the processor, said output device configured to transmit a speed control signal based on the reference time profile to a vehicle speed control system.

2. A system in accordance with Claim 1 wherein said processor is further programmed to adjust a speed of the vehicle using the speed control signal.

3. A system in accordance with Claim 1 wherein said processor is further programmed to select $\alpha$ based on a selectable frequency of speed changes and a selectable allowable magnitude of speed changes.

4. A system in accordance with claim 1 further comprising a display device configured to graphically display the generated reference time profile.

5. A method of controlling a speed of a vehicle along a track, said method comprising:
    receiving a required time of arrival (RTA) at a predetermined waypoint;
    determining a late time bound representing the latest time the vehicle could arrive at a point along the track and still arrive at the predetermine waypoint at the RTA while transiting at a maximum available speed;
    determining an early time bound representing the earliest time the vehicle could arrive at a point along the track and still arrive at the predetermine waypoint at the RTA while transiting at a minimum available speed;
    applying a control aggressiveness scaling factor $\gamma$ that is selected to provide a control aggressiveness to at least one of the late time bound and the early time bound, scaling factor $\gamma$ controlling a frequency of speed corrections and a magnitude of speed corrections;
    generating a speed control signal based on the early and late time bounds; and
    outputting a speed signal to a vehicle speed control system.

6. A method in accordance with claim 5 further comprising graphically displaying the early and late time bounds and a speed profile to meet the RTA.

7. A method in accordance with claim 5 wherein receiving a required time of arrival at a predetermined waypoint comprises determining a time-of-arrival at a plurality of points between a current position of the vehicle and the predetermined waypoint computed using a selectable reference speed.

8. A method in accordance with claim 5 wherein determining a late time bound comprises determining at a plurality of points along the track from the predetermined waypoint to the current position of the vehicle the cumulative latest time the vehicle could arrive at the point and still arrive at the predetermined waypoint at the RTA using the minimum available speed at each the respective plurality of points.

9. A method in accordance with claim 5 wherein determining a early time bound comprises determining at a plurality of points along the track from the predetermined waypoint to the current position of the vehicle the cumulative earliest time the vehicle could arrive at the point and still arrive at the predetermined waypoint at the RTA using the maximum available speed at each the respective plurality of points, 10. A method in accordance with Claim 5 wherein applying a control aggressiveness scaling factor $\gamma$ comprises applying a control aggressiveness scaling factor $\gamma$ having a value $0.0 < \gamma < 1.0$.

11. A method in accordance with claim 5 wherein applying a control aggressiveness scaling factor $\gamma$ comprises applying a first control aggressiveness scaling factor $\gamma_{late}$ to the late time bound and a second control aggressiveness scaling factor $\gamma_{early}$ to the early time bound wherein $\gamma_{early}$ is different than $\gamma_{late}$.

12. A method in accordance with claim 5 wherein applying a control aggressiveness scaling factor $\gamma$ comprises applying a control aggressiveness scaling factor $\gamma$ that is time-dependant.

13. A method in accordance with claim 5 further comprising determining an uncertainty associated with the current time (CTU).

14. A method in accordance with claim 5 further comprising determining an uncertainty associated with the current time (CTU) using:

$$CTU = \sqrt{\frac{EPU^2}{Groundspeed^2} + ITU^2}, \text{ where}$$

EPU represents an estimated position uncertainty expressed as a 95% certainty and is normally distributed, and ITU represents an input time uncertainty (ITU) expressed as a 95% certainty and is normally distributed.

15. A method of controlling a speed of a vehicle, said method comprising:
    determining a required time of arrival (RTA) deadband including an activate late control that generates a first speed control signal and an activate early control that generates a second speed control signal, where the RTA represents the required time-of-arrival at an RTA waypoint. using a first time profile necessary to meet an intermediate control time, starting from a current aircraft position at a current time and a second time profile necessary to meet the RTA starting from the intermediate control point at the intermediate control time; and outputting at least one of the first speed control signal and the second speed control signal to a vehicle speed control system, 16. A method in accordance with claim 15 wherein determining a required time of arrival deadband comprises performing an activate late control if a difference between the RTA and a current time is greater than a minimum time to go value and a difference between an estimated time of arrival (ETA) and the RTA is greater than a minimum tolerance value and if a difference between a latest arrival time (LAT) and the current time scaled by a factor, $\gamma_{LATE}$ is less than or equal to a current time uncertainty (CTU), where the minimum time to go value represents a predetermined minimum amount of time before reaching the RTA waypoint to permit a change in speed, the minimum tolerance value represents the smallest allowable value of the RTA tolerance, and the LAT represents a late time profile at a current distance to the RTA Waypoint.

17. A method in accordance with claim 15 wherein determining a required time of arrival deadband comprises performing an activate early control if a difference between the RTA and if a current time is greater than a minimum time to go value and a difference between an estimated time of arrival (ETA) and the RTA is less than or equal to a negative minimum tolerance value and if a difference between the current time and an earliest arrival time (EAT) scaled by a factor $\gamma_{early}$ is less than or equal to a current time uncertainty (CTU).

18. A method in accordance with claim 15 further comprising:

determining a magnitude of a time bias using, if a time to go is greater than a first constant multiplied by a minimum tolerance then the time bias is set to equal approximately zero, else the magnitude of the time bias is set to approximately equal to the time to go divided by the first constant minus the minimum tolerance; and determining an RTA correction wherein a difference between an estimated time of arrival (ETA) and the RTA plus the time bias is approximately zero, wherein a sign of the time bias is the same as the sign of the ETA minus the RTA, where the time to go represents the minimum time to go to the RTA waypoint to allow a speed change.

19. A system in accordance with claim 15 further comprising:

determining an uncertainty of arrival due to an external influence, wherein said external influence comprises at least one of a wind speed and direction, a climb or descent to avoid weather, and a heading change to avoid weather; and wherein determining a required time of arrival (RTA) deadband comprises determining a required time of arrival (RTA) deadband using the determined uncertainty of arrival due to an external influence.

20. A method in accordance with claim 15 further comprising graphically displaying the RTA deadband.

* * * * *

UNITED STATES PATENT AND TRADEMARK OFFICE
CERTIFICATE OF CORRECTION

PATENT NO.         : 8,010,267 B2
APPLICATION NO.    : 12/262326
DATED              : August 30, 2011
INVENTOR(S)        : Klooster et al.

It is certified that error appears in the above-identified patent and that said Letters Patent is hereby corrected as shown below:

In Claim 1, line 20, delete "and $\alpha$is" and insert therefor -- and $\alpha$ is --.

In Claim 9, line 27, delete "plurality of points," and insert therefor -- plurality of points. --.

In Claim 15, lines 5-6, delete "speed control system," and insert therefor -- speed control system. --.

Signed and Sealed this
Twenty-first Day of February, 2012

David J. Kappos
*Director of the United States Patent and Trademark Office*

UNITED STATES PATENT AND TRADEMARK OFFICE
CERTIFICATE OF CORRECTION

PATENT NO. : 8,010,267 B2
APPLICATION NO. : 12/262326
DATED : August 30, 2011
INVENTOR(S) : Klooster et al.

Page 1 of 1

It is certified that error appears in the above-identified patent and that said Letters Patent is hereby corrected as shown below:

Column 9, line 20, (Claim 1, line 13) delete "and αis" and insert therefor -- and α is --.

Column 10, line 27, (Claim 9, line 7) delete "plurality of points," and insert therefor -- plurality of points. --.

Column 11, lines 5-6, (Claim 15, lines 14-15) delete "speed control system," and insert therefor -- speed control system. --.

This certificate supersedes the Certificate of Correction issued February 21, 2012.

Signed and Sealed this
Twentieth Day of March, 2012

David J. Kappos
*Director of the United States Patent and Trademark Office*